Feb. 14, 1933.  L. L. VIEL  1,897,742

REGULATOR FOR THE FUEL PRESSURE IN INTERNAL COMBUSTION ENGINES

Filed April 28, 1931

INVENTOR
Louis-Léon Viel
by Byrnes, Stebbins, Parmelee & Henne
his attorneys

Patented Feb. 14, 1933

1,897,742

UNITED STATES PATENT OFFICE

LOUIS LÉON VIEL, OF VILLE D'AVRAY, FRANCE, ASSIGNOR TO SOCIETE GENERALE DES CARBURATEURS ZENITH, OF LEVALLOIS-PERRET, FRANCE

REGULATOR FOR THE FUEL PRESSURE IN INTERNAL COMBUSTION ENGINES

Application filed April 28, 1931, Serial No. 533,456, and in Belgium May 1, 1930.

In carburetters for internal combustion engines, it is necessary, in order to obtain a certain accuracy of the output of the calibrated orifices, to feed these calibrated orifices at a well defined pressure. This well defined pressure is obtained most often by means of a float chamber.

The float chamber has the drawback that it does not work when it is upside-down; this drawback is serious for carburetters used in aviation, stunt flying necessitating operation of the engine in all positions and even in the completely inverted position in upside down flying.

The present invention has for its object an arrangement which is intended to replace the float chamber and the operation of which is not affected by the position of the apparatus.

The principle of the float chamber is the following: the fuel in the float chamber has a free surface subjected to a well defined pressure, for example atmospheric pressure. A valve controls the supply of fuel to the float chamber; movement of this valve is dependent upon variation of the level of the surface of the fuel in the float chamber. This dependency is obtained by means of a float which follows the variations of level and which controls the valve. The level settles in a constant position and, in this way, establishes at a fixed point a well defined pressure which is the pressure transmitted to the float chamber.

In the device which constitutes the object of the invention, the free surface of the float chamber is replaced by a contact surface between the fuel contained in a reservoir and a deformable membrane subjected on its external face to a well defined pressure. The fuel valve is connected to the said membrane and follows, consequently, the displacements of the membrane. The portions of the fuel which are in contact with the membrane are subjected to the definite pressure exerted on the external face of the said membrane if the latter has no elastic reaction and if it is not loaded. Particularly if the membrane is simply subjected to atmospheric pressure, the surface of contact between the liquid and the membrane is itself at atmospheric pressure like the free surface in a float chamber.

If the pressure tends to increase in the fuel reservoir, the membrane stretches and closes the fuel valve. If the pressure falls, the membrane is depressed and opens the fuel needle valve.

As in the case of a float chamber, a surface having a fixed position is therefore obtained, on which the pressure is well defined.

The membrane of the arrangement which is the object of the invention is not necessarily horizontal and it may have any direction, the pressure which exists at the centre of gravity of the membrane being independent of this direction.

The following description with respect to the appended drawing given as an example, will cause the manner in which the invention may be carried out to be well understood.

Figure 1:
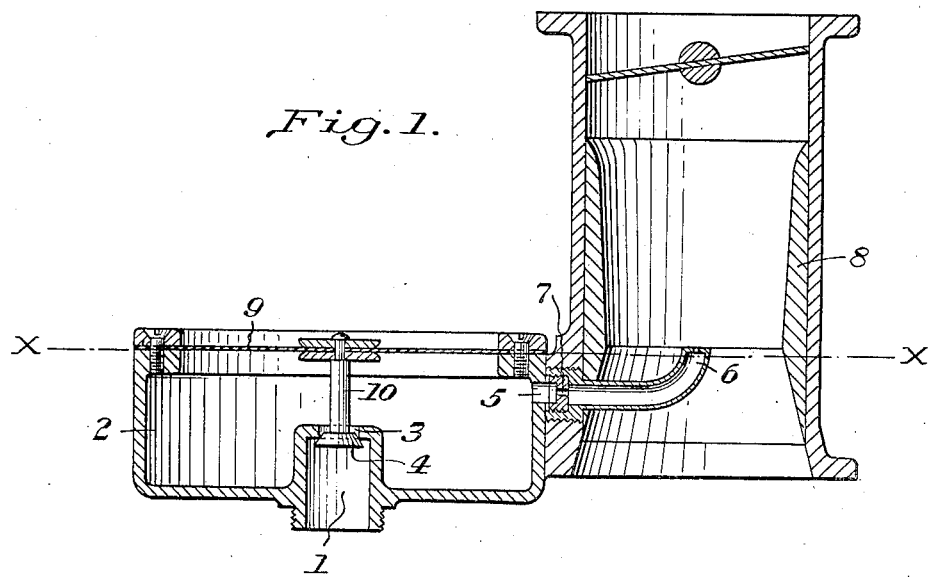
Fig. 1 represents diagrammatically a manner of carrying out the invention.

In the device represented in Fig. 1, the fuel is brought under a certain load by the passage 1 communicating with the reservoir 2 by the orifice 3 controlled by the valve 4. The reservoir 2 is provided with an outlet passage for the fuel 5 supplying the fuel outlet 6 by means of the calibrated orifice 7; the fuel outlet 6 is disposed in a venturi 8. The reservoir 2 is closed at its upper portion by a deformable membrane 9 which has no elastic reaction and which is connected at its centre by a rod 10 to the valve 4. Preferably the membrane 9 is not extensible. The external face of the membrane 9 is subjected to atmospheric pressure, the internal face being in contact with the fuel.

In the plane X—X, including the internal face of the membrane 9, the liquid is subjected to the atmospheric pressure which acts through the membrane 9. The surface of the liquid at X—X therefore plays exactly the part in the free surface of a float chamber. If the level of fuel tends to rise in the reservoir 2, the membrane 9 lifts and closes the valve 4. If the level has a tendency to descend, the membrane becomes depressed and opens the valve 4.

The membrane 9 is not necessarily horizontal, and the operation of the device is the same whatever is its direction; the pressure of the liquid at the centre of gravity of the membrane always remains equal to atmospheric pressure, whatever may be the position.

In the device of Fig. 1, the pressure at the centre of gravity of the membrane is equal to atmospheric pressure.

It is also possible, principally in the case of an aviation engine where the speed of the aeroplane is used for creating an extra pressure in the air intake, to subject the membrane to the action of this extra pressure by connecting the chamber 11 with the air intake. This variation has been represented in Fig. 2; in this figure, a passage 12 connects with the air intake 13 the chamber 11 adjacent to the external face of the membrane 9 closing the reservoir 2. The same arrangement is applicable when air is supplied to the carburetter by a supercharger.

The extra pressure created by the air stream having a dynamic origin, the action which it exerts on the membrane 9 depends on the direction in which the passage 12 opens in the air intake 13 and depends also on the section of the passage 12. The relative dimensions of the membrane 9 and passage 12 may be proportioned so as to obtain the desired dynamic effect on the membrane; for example, a calibrated orifice may be provided in the passage 12. If the passage 12 is rectilinear and is directed in the direction of the stream of air, a very great extra pressure can be transmitted to the membrane 9.

If it is desired to use only a portion of the extra pressure existing in the air intake, the chamber 11 will be connected to the atmosphere by a calibrated orifice 15 so as to create a leakage of air through this orifice. The ratio between the sections of the calibrated orifices 14 and 15 will define the fraction of the extra pressure which is transmitted to the membrane 9. This transmitted extra pressure may be regulated by means of a needle valve 16 controlling the orifice 15.

Figure 2:
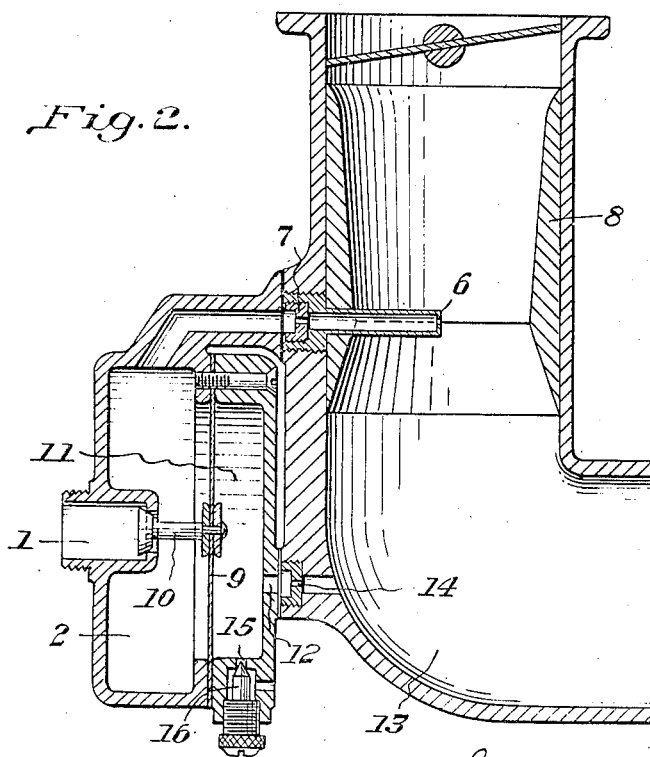
Fig. 2 represents a variation of construction of the invention in which the membrane is subjected on its external face to the pressure existing in the air intake of the carburetter.

Figs. 1 and 2 are purely diagrammatic and the constructions which they represent may be modified in many ways in detail without departing from the invention.

For example, the mechanical connection between the membrane 9 and the valve 4 may be modified, this connection being obtained, for example, by means of a system of levers; it can also be uni-lateral, the membrane controlling only the closure of the valve. This mechanical connection may also be as varied as the connections between the float and the valve in the float chamber type of construction which are known; it suffices that this connection be such that the displacement of the membrane which corresponds to an increase of volume of the reservoir causes the closure of the valve.

The arrangement of the details such as guiding of the valve, guiding of the membrane, etc., have not been shown either.

Regulators of somewhat similar nature for fuel pressure have been proposed, but in the known devices, the membrane is loaded by a spring or by a weight, or further, the membrane is resilient.

Loaded membranes have the drawback of requiring an adjustment of the load, and resilient membranes are too stiff and therefore not very responsive.

According to the invention, the membranes are not loaded and have no elastic reaction, whereby these drawbacks are avoided.

What I claim is:

1. In a device for regulating the pressure of the fuel supplying an internal combustion engine, the combination of a fuel chamber, a fuel inlet and a fuel outlet connected with said fuel chamber, and a deformable unit which is adapted to be responsive only to fluid pressures and which comprises a valve controlling said fuel inlet, a membrane without elastic reaction forming part of the wall of the said fuel chamber and a connection between said valve and said membrane.

2. In a carburetter for an internal combustion engine having an air intake, a mixing chamber and a device for regulating the pressure of the fuel supplying said mixing chamber, the combination of a fuel chamber, a fuel inlet to said fuel chamber, a fuel outlet connecting said fuel chamber with said mixing chamber, a deformable unit which is adapted to be responsive only to fluid pressures and which comprises a valve controlling said fuel inlet, a membrane without elastic reaction forming part of the wall of the said fuel chamber and a connection between said valve and said membrane, an air chamber separated from the said fuel chamber by the said membrane and a passage connecting the said air chamber with said air intake.

3. In a carburetter for an internal combustion engine having an air intake, a mixing chamber and a device for regulating the pressure of the fuel supplying said mixing chamber, the combination of a fuel chamber, a fuel inlet to said fuel chamber, a fuel outlet connecting said fuel chamber with said mixing chamber, a deformable unit which is adapted to be responsive only to fluid pressures and which comprises a valve controlling said fuel inlet, a membrane without elastic reaction forming part of the wall of the said fuel chamber and a connection between said valve and said membrane, an air chamber separated from the said fuel chamber by the said membrane, a passage connecting the said air chamber with said air intake, and a vent to said air chamber.

4. In a carburetter for an internal combustion engine having an air intake, a mixing chamber and a device for regulating the pressure of the fuel supplying said mixing chamber, the combination of a fuel chamber, a fuel inlet to said fuel chamber, a fuel outlet connecting said fuel chamber with said mixing chamber, a deformable unit which is adapted to be responsive only to fluid pressures and which comprises a valve controlling said fuel inlet, a membrane without elastic reaction forming part of the wall of the said fuel chamber and a connection between said valve and said membrane, an air chamber separated from the said fuel chamber by the said membrane, a rectilinear passage connecting the said air chamber with the said intake and parallel to the air stream in the said air intake, and an adjustable vent to said air chamber.

In testimony whereof I affix my signature.

LOUIS LÉON VIEL.